United States Patent Office 2,859,193
Patented Nov. 4, 1958

2,859,193

AQUEOUS DISPERSION COMPRISING CARBOXYL CONTAINING ELASTOMER, VULCANIZING AGENT, AND FORMALDEHYDE

Anthony Andrew Kowalewski, Lorain, Ohio, assignor to The B. F. Goodrich Company, New York, N. Y., a corporation of New York No Drawing. Application July 30, 1956
Serial No. 600,717

4 Claims. (Cl. 260—29.7)

This invention relates to aqueous dispersions of elastomers and relates more particularly to novel aqueous dispersions of carboxyl containing elastomers comprising said elastomer and formaldehyde, which dispersions when deposited and dried form crack-free films and articles having excellent physical properties.

Synthetic elastomer latices useful in dipping processes have long been an objective of those skilled in the latex art. Some success has been realized through the use of latices of carboxyl containing elastomers. However, in many dipping operations, particularly coagulant dipping, such latices do not ordinarily deposit crack-free films which are essential in the preparation of such articles as gloves, inflatables, prophylactic, tubing, and the like. It is accordingly one of the objects of this invention to provide an aqueous dispersion of an elastomer which may be deposited to form uniform films having excellent physical properties which do not crack on drying or during curing. Other objects will be apparent from the description of the invention which follows.

It has now been discovered that certain carboxyl containing elastomer dispersions which contain a hereinafter defined amount of formaldehyde and are at a pH between hereinafter defined limits may be used to prepare uniform, crack-free, coagulant dipped elastomer films having excellent surface characteristics. Formaldehyde and pH control of the dispersions are necessary to obtain the advantages of this invention.

The aqueous dispersions of this invention comprise an aqueous dispersion of an elastomer containing from about 0.01 to about 0.2 chemical equivalents of carboxyl groups attached to the polymer chains per 100 weight parts of said elastomer, from about 0.1 to about 5 weight parts of formaldehyde per 100 weight parts of elastomer, said dispersion being at a pH between about 9 and about 11.5. These dispersions are quite valuable in dipping applications and are particularly adapted for use in coagulant dipping processes.

Although dispersions in accordance with this invention may be prepared from any elastomer containing the defined concentration of carboxyl groups attached to the polymer chains of said elastomer, particularly valuable aqueous dispersions are obtained from carboxyl containing polymers of open chain aliphatic conjugated dienes of the nature described and disclosed in U. S. Patent 2,724,707. Such aqueous dispersions are prepared from monomeric mixtures polymerized under acidic conditions in water, the monomeric mixture comprising at least 50% by weight of an open chain aliphatic conjugated diene such as butadiene-1,3 and lesser amounts of one or more of an olefinically unsaturated carboxylic acid such as acrylic acid and methacrylic acid so that the elastomer contains about 0.01 to 0.2 chemical equivalents per 100 weight parts elastomer of carboxyl groups. Other additional monomeric materials may be present if desired. For example, such monomers as acrylonitrile and methyl methacrylate in the monomer mixture result in useful compositions.

The amount of formaldehyde used may be varied from about 0.1 to 5 weight parts per 100 weight parts of elastomer. Better results are ordinarily obtained when the concentration of formaldehyde is varied between about 0.3 and about 2.0 weight parts. Formaldehyde is ordinarily available in a 40% solution in water. For most aqueous polymer dispersions this is too concentrated to safely use by direct addition to latex. Ordinarily the formaldehyde solution is diluted to between about 1% and 15% in water, and more preferably between about 3% and 10% in water. It will be understood that the more dilute the formaldehyde is, the easier it is to add to the latex without the danger of formation of coagulum. However, very dilute formaldehyde will introduce larger amounts of water into the dispersion than is ordinarily desired since in latex compounding it is advantageous to keep the concentration of elastomer and all compounding ingredients as high as possible by adding no more water than is necessary. More concentrated solutions may be added to the more stable latices and dispersions.

An essential feature of the aqueous dispersions of this invention is that they be at a pH of between about 9.0 and about 11.5, more desirably from about 9.5 to 11.0. When the pH of the dispersion is below about 9.0, i. e., a pH of 8, the advantages sought through the use of formaldehyde are lost and non-uniform films which contain cracks are obtained. When the pH of the dispersion is greater than about 11.5, i. e., a pH of 12, darkening of the films is noted and the dispersions tend to gel and often result in non-uniform deposits. The desired pH of the dispersions is obtained through the use of alkaline additives. Buffered dispersions which are well known to those skilled in the art are also employed. Ammonium hydroxide is a useful and valuable additive to obtain the desired pH. Of course, if the pH of the dispersion is in the desired range after the formaldehyde and compounding pigments are added, no adjustment is required.

The curing agents which may be employed in the dispersion of this invention include the polyvalent metal oxides as are described in U. S. Patent 2,724,707. Particularly preferred are the divalent metal oxides, zinc oxide, calcium oxide, cadmium oxide, magnesium oxide and the like. The amount of metal oxide employed may be varied in accordance with the teachings of this patent but ordinarily should be an amount equivalent to at least ½ the carboxyl content of the elastomer. Another class of curing agents are the water-soluble metal salts of the amphoteric hydroxides such as the alkali metal aluminates represented by sodium aluminate, also in amounts equivalent to at least ½ the carboxyl content of the elastomer. Also valuable and useful are curing systems utilizing sulfur and sulfur-containing vulcanizing and accelerating agents which are well known to those skilled in the art. The amount of these agents will depend, of course, upon the degree of cure required. Other normal compounding ingredients usually employed in compounding latex may likewise be advantageously used in the dispersions of this invention.

As stated before, the dispersions of this invention are particularly valuable in coagulant dip applications. Such techniques are well known in the latex art and ordinarily involve dipping a smooth-surface form into a coagulant such as alcoholic calcium nitrate and similar coagulant media, and then dipping the wetted form into latex, and then washing and drying the deposited film.

The rubbery polymeric materials of the latices or aqueous dispersions comprise predominantly linear carbon chains to which are attached carboxyl groups and are preferably the plastic polymers of an open chain aliphatic conjugated diene containing a controlled amount and distribution of combined carboxyl (—COOH) groups attached to the polymer chains. In the preparation of the aqueous dispersions of conjugated dienes the open chain, aliphatic conjugated diene may be any of the butadiene-1,3 hydrocarbons such as butadiene-1,3 itself, 2-methyl butadiene-1,3 (isoprene), 2,3-dimethyl butadiene-1,3, piperylene, 2-neopentyl butadiene-1,3 and other hydrocarbon homologs of butadiene-1,3, or it may be any of the straight chain conjugated pentadienes or the straight and branch chain conjugated hexadienes and others. The butadiene-1,3 hydrocarbons and butadiene-1,3 in particular, because of ability to produce stronger and more desirable elastomeric polymers for use in latex applications, are much preferred.

Any olefinically-unsaturated carboxylic acid which polymerizes with such a diene to produce rubbery carboxyl-containing polymers and which are characterized by possessing one or more olefinic carbon-to-carbon double bonds and one or more carboxyl (—COOH) groups may be utilized. That is, there may be utilized monocarboxy and polycarboxy, monoolefinic and polyolefinic acids including, for example, such widely divergent materials as acrylic acid, the alpha-alkyl acrylic acids, crotonic acid, beta-acryloxy propionic acid, alpha- and beta-vinyl acrylic acids, alpha-beta-isopropylidene propionic acid, sorbic acid, cinnamic acid, maleic acid, and others.

It is preferred to utilize, as the olefinically-unsaturated acid polymerized with the diene, one or more olefinically-unsaturated carboxylic acids containing at least one activated olefinic carbon-to-carbon double bond, that is, an acid containing an olefinic double bond which readily functions in an addition polymerization reaction because of the double bond being present in the monomer molecule either in the alpha-beta position with respect to the strongly polar carboxyl group thusly $$\begin{array}{c} H\ H \\ |\ | \\ -C=C-COOH \end{array}$$

or attached to a strongly reactive terminal methylene grouping thusly $CH_2=C<$. Acids of this type are described in U. S. Patent 2,724,707.

Best results are obtained by interpolymerizing with a conjugated diene a monoolefinic monocarboxylic acid in which the double bond is both in alpha-beta position with respect to the carboxyl group and is terminal methylene in structure, such as the acrylic acids including acrylic acid, methacrylic acid, alpha-chloro acrylic acid, ethacrylic acid, and the like and other acids of this structure and mixtures of such acids, containing 3 to 8 carbon atoms.

The initial proportions of conjugated diene and acid are not critical as long as a polymer is obtained which is plastic and contains sufficient combined carboxyl as will be hereinafter defined. Particularly valuable rubber-like or elastomeric materials are the interpolymers made from monomeric mixtures containing from about 45 to 94% by weight of a butadiene-1,3 hydrocarbon such as butadiene-1,3, from about 1 to 20% by weight of an acid such as methacrylic acid, acrylic acid, sorbic acid or the like, and from about 5 to 50% by weight of acrylonitrile, the styrenes, alkyl acrylates and methacrylates and the like. This third monomer may be any of the vinylidene monomers or mixtures thereof, that is, unsaturated compounds containing the $H_2C=C<$ group. The vinylidene compounds contain a terminal methylene group attached by double bond to the carbon atom. Examples of such compounds include vinylidene compounds containing only one carbon-to-carbon unsaturated bond such as vinyl chloride; vinyl acetate; vinylidene chloride; vinyl fluoride; dichlorodifluoroethylene; vinyl acetate; the styrenes including alpha-substituted styrenes such as alpha-methyl styrene, vinyl toluene, the chlorostyrenes, alkoxy-styrenes and the like; acrylonitrile, methacrylonitrile and chloroacrylonitrile; the alkyl acrylates and methacrylates; the alkyl vinyl ethers and alkyl vinyl ketones; the acrylamides; vinyl pyridine; vinyl benzoate and other similar monoolefinic compounds polymerizable with butadiene-1,3 by a free radical mechanism in aqueous systems. It will be understood that the vinyl compounds are a species of vinylidene compounds since they contain characteristic

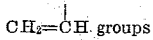
$CH_2=CH$ groups

Any other latex or aqueous dispersion of plastic rubbery polymeric materials comprising predominantly linear carbon chains to which are attached carboxyl groups, regardless of whether the carboxyl groups are introduced by interpolymerization, by hydrolysis of groups in the polymer chain as described in U. S. Patent 2,710,292, by reaction of a rubbery material with a carboxylating agent as described in U. S. Patent 2,662,874, or by any other chemical reaction, are utilizable in preparing the latex compositions of this invention. Less desirable, but often useful, is the preparation of a carboxyl containing polymer whereby the carboxyl group is introduced into the polymer chain in the solid form, which solid then is dispersed in water and the dispersion of this invention prepared therefrom.

It is important, however, that the plastic, synthetic rubbery materials, regardless of how produced, contain a controlled amount of combined carboxyl more or less uniformly distributed over the polymer chains. For the purposes of this invention they should contain from 0.005 to about 0.15 to 0.20 chemical equivalents by weight of carboxyl groups per 100 parts by weight of rubbery material (hereinafter referred to as "equivalents per hundred rubber" and abbreviated "e. p. h. r."). Latices of plastic synthetic rubbery materials containing preferably from about 0.01 to 0.1 e. p. h. r. of carboxyl when treated according to this invention readily produce, on drying and heating, elastic polymeric materials of a predominantly rubbery nature having a good balance of tensile strength, modulus, elongation and other excellent properties. For coagulant dipping, the elastomer of the latices preferably has a Mooney value greater than about 50 M. L. and as high as about 200 M. L. and more preferably they have a Mooney value between about 80 M. L. and about 180 M. L. Useful dispersions are prepared from monomer mixtures of about 50 to 80 weight parts of butadiene-1,3, about 50 to 15 weight parts of acrylonitrile and from 1 to 10 weight parts of methacrylic acid. Even more valuable dispersions are obtained from monomer mixtures containing about 50 to 69 weight parts of butadiene-1,3, about 30 to 45 weight parts of acrylonitrile and about 1 to about 5 weight parts of methacrylic acid polymerized in water to a total solids content of greater than about 40 to 45%.

*Example I*

An aqueous dispersion of a monomer mixture containing about 42% acrylonitrile, 55% butadiene and 3% methacrylic acid is prepared and polymerized in aqueous emulsion at a pH below about 7. The latex contains about 45% total solids. The elastomer of this dispersion has a Mooney value of about 145 M. L. and a carboxyl content of about 0.03 e. p. h. r. There are also prepared 50% dispersions in water (1) zinc oxide (2) sulfur and (3) butyl zimate. 5% solutions of sodium aluminate and formaldehyde are also provided. These materials are mixed together in the ratios set forth in the table below and the pH of each compounded aqueous dispersion is then adjusted to 10.5. These dispersions are allowed to age for 24 hours. Coagulant dipped films are prepared by immersing four by six inch porcelain enameled steel panels in a coagulant solution which is a 25% solution of calcium nitrate in ethyl alcohol. The panels are removed from the coagulant and allowed to drain for one minute. The panels are then slowly immersed into one of the compounded dispersions, held for one minute, slowly withdrawn from the compounded dispersion, slowly immersed into the coagulant solution, again held for 30 seconds, are withdrawn and washed in circulating water at 100° F. for one hour. The films on the panels are dried for one hour at 100° F. and cured for 20 minutes at 220° F. The films are removed from the test panels and aged at 50% relative humidity prior to testing. Thicker films can be prepared by making additional immersions of the panels as described. The compounds prepared (materials as parts per hundred of elastomer) and physical properties of cured films therefrom are set forth below:

| Sample | 1 | 2 | 3 | 4 | 5 |
| --- | --- | --- | --- | --- | --- |
| Elastomer | 100.0 | 100.0 | 100.0 | 100.0 | 100.0 |
| Zinc Oxide | 9.0 | 9.0 | 9.0 | | 5.0 |
| Sulfur | | | | | 2.0 |
| Butyl Zimate | | | | | 2.0 |
| Sodium Aluminate | | | | 0.5 | |
| Formaldehyde | 0.1 | 0.2 | 0.3 | 0.5 | 0.5 |

| Sample | Tensile Strength, p. s. i. | Elongation, Percent | 300% Modulus, p. s. i. | Graves Tear, lbs. per sq. in. |
| --- | --- | --- | --- | --- |
| 1 | 2,612 | 637 | 392 | 210 |
| 2 | 2,747 | 610 | 446 | 208 |
| 3 | 3,060 | 630 | 447 | 200 |
| 4 | 2,890 | 640 | 315 | 175 |
| 5 | 2,885 | 520 | 481 | 175 |

When the above compounded dispersions are used to make gloves on a porcelain glove form following the same general procedure, uniform films in both the wet and dry condition are obtained and the cured gloves are uniform in thickness, are free of cracks and have excellent surface. When gloves are similarly made with compounded dispersions not containing formaldehyde and dispersions at a pH of 7 to 8, films deposited by this procedure are less uniform than those above and the cured glove article contains many cracks and in some cases it is not possible to obtain continuous films.

*Example II*

An elastomer dispersion of the type described in Example I is similarly compounded with 9 weight parts of zinc oxide, and to three separate portions of this compound are added 0.5, 1.0 and 2.0 weight parts of formaldehyde in 5% solution and the pH of the dispersions adjusted to 10.2 with ammonium hydroxide. These compounded dispersions are stable after storage at 72 hours. Films made from these dispersions by the procedure outlined in Example I have the following physical properties:

| Sample | Tensile Strength, p. s. i. | Elongation, Percent | 300% Modulus, p. s. i. | Graves Tear, lbs. per sq. in. |
| --- | --- | --- | --- | --- |
| 1 (0.5 HCHO) | 3,815 | 690 | 530 | 164 |
| 2 (1.0 HCHO) | 2,801 | 690 | 464 | 147 |
| 3 (2.0 HCHO) | 2,962 | 680 | 472 | 153 |

When dipped gloves are prepared from these three compositions, excellent gloves of uniform thickness which are crack-free are obtained. When the pH of sample 3 is about 8.5, satisfactory crack-free films are not obtained. Similarly when no formaldehyde is used, crack-free gloves and films cannot be obtained.

When the above examples are repeated with other elastomers including those containing from about 0.03 to 0.05 chemical equivalents of carboxyl derived from acrylic acid, sorbic acid, and mixtures of acrylic and methacrylic acid, and from monomer mixtures containing methyl methacrylate and styrene in place of acrylonitrile, and with other divalent metal oxides such as cadmium oxide, magnesium oxide and the like, similar valuable dispersions adapted to form crack-free films are obtained.

Although representative embodiments of the invention have been specifically described, it is not intended or desired that the invention be limited solely thereto since it will be apparent to those skilled in the art that modifications and variations may be made without departing from the spirit and scope of the invention as defined in the appended claims.

I claim:

1. An aqueous dispersion especially adapted to form elastic crack-free deposits, said dispersion comprising (1) solid particles of a carboxyl-containing elastomeric polymer, said polymer having been prepared by polymerizing in an acidic aqueous medium a mixture of monomeric materials comprising at least about 45% by weight of butadiene-1,3 together with an olefinically unsaturated carboxylic acid copolymerizable with butadiene-1,3, in an amount sufficient to produce a polymer containing from 0.005 to 0.2 chemical equivalents by weight of combined carboxyl groups per 100 parts by weight of polymer (2) a vulcanizing agent for said carboxyl-containing elastomeric polymer in an amount sufficient to vulcanize said polymer, said vulcanizing agent being selected from the class consisting of divalent metal oxides, alkali metal aluminates and sulfur and (3) from about 0.1 to 5 weight parts of formaldehyde per 100 weight parts of said polymer, said aqueous dispersion being at a pH of from about 9.0 to 11.5.

2. An aqueous dispersion according to claim 1 further characterized in that the carboxyl containing elastomeric polymer is a polymer prepared by the polymerization in acidic aqueous emulsion of a mixture of monomeric materials containing from about 50 to 80% by weight of butadiene-1,3, from about 15 to 50% by weight of acrylonitrile and from about 1 to 10% by weight of acrylic acid, said polymer containing from 0.01 to 0.1 chemical equivalents by weight of combined carboxyl groups per 100 parts by weight of polymer.

3. An aqueous dispersion according to claim 1 further characterized in that the carboxyl containing elastomeric polymer is a polymer prepared by the polymerization in acidic aqueous emulsion of a mixture of monomeric materials containing from 50 to 80% by weight of butadiene-1,3, from 15 to 50% by weight of acrylonitrile and from 1 to 10% by weight of methacrylic acid, said polymer containing from 0.01 to 0.1 chemical equivalents by weight of combined carboxyl groups per 100 parts by weight of polymer.

4. An aqueous dispersion according to claim 3 further characterized in that the carboxyl containing elastomeric polymer is prepared by the polymerization in acidic aqueous emulsion of a monomeric mixture of about 55% butadiene-1,3, about 42% acrylonitrile and about 3% methacrylic acid, said polymer containing about 0.03 chemical equivalents by weight of combined carboxyl groups per 100 parts by weight of polymer; in that the said dispersion contains about 0.5 part of formaldehyde per 100 weight parts of said polymer and in that said dispersion has a pH of about 10.5.

References Cited in the file of this patent

UNITED STATES PATENTS

| | | |
| --- | --- | --- |
| 2,469,409 | Powers | May 10, 1949 |
| 2,604,668 | Miller | July 29, 1952 |
| 2,724,707 | Brown | Nov. 22, 1955 |